United States Patent [19]
Chee

[11] Patent Number: 5,467,941
[45] Date of Patent: Nov. 21, 1995

[54] PYLON AND ENGINE INSTALLATION FOR ULTRA-HIGH BY-PASS TURBO-FAN ENGINES

[75] Inventor: Wan T. Chee, Bellevue, Wash.

[73] Assignee: The Boeing Company, Seattle, Wash.

[21] Appl. No.: 175,859

[22] Filed: Dec. 30, 1993

[51] Int. Cl.$^6$ .................................................. B64D 27/00
[52] U.S. Cl. ........................... 244/54; 60/39.31; 248/554; 248/555
[58] Field of Search ...................... 244/54, 55; 60/39.31; 248/554, 555

[56] References Cited

U.S. PATENT DOCUMENTS

| | | | |
|---|---|---|---|
| 3,844,115 | 10/1974 | Freid | 60/39.31 |
| 4,055,041 | 10/1977 | Adamson et al. | 60/226 R |
| 4,132,069 | 1/1979 | Adamson et al. | 60/226 R |
| 4,222,234 | 9/1980 | Adamson | 244/54 |
| 4,326,682 | 2/1982 | Nightingale | 244/54 |
| 4,437,627 | 3/1984 | Moorehead | 244/54 |
| 4,471,609 | 9/1984 | Porter et al. | 60/39.31 |
| 4,474,346 | 10/1984 | Murphy et al. | 244/54 |
| 4,555,078 | 11/1985 | Grognard | 244/54 |
| 4,603,821 | 8/1986 | White | 244/54 |
| 4,710,412 | 12/1987 | Darrieax | 244/58 |
| 4,854,525 | 8/1989 | Chee | 244/54 |
| 4,940,196 | 7/1990 | Lardellier | 244/54 |
| 5,303,896 | 4/1994 | Sterka | 244/54 |
| 5,320,307 | 6/1994 | Spofford et al. | 244/54 |
| 5,347,884 | 9/1994 | Garnjost et al. | 248/554 |

FOREIGN PATENT DOCUMENTS

| | | | |
|---|---|---|---|
| 0115914A1 | 8/1984 | European Pat. Off. | B64D 27/18 |
| 530385 | 12/1940 | United Kingdom | 244/54 |

Primary Examiner—Andres Kashnikow
Assistant Examiner—Virna Lissi Mojica
Attorney, Agent, or Firm—Christensen, O'Connor, Johnson & Kindness

[57] ABSTRACT

A pylon (14) for supporting a turbo-fan jet engine, in particular, an ultra-high by-pass turbo-fan jet engine (12) is disclosed. The pylon (14) attaches to the forward and aft parts of the engine core (22) and supports the engine (12) from an airplane wing (10) while resisting static and dynamic forces applied by the engine and the nacelle of the engine to the pylon. The pylon (14) includes a pylon bifurcation portion (16), having an upper end (23) and a lower end. The upper end (23) is positioned exterior to the fan duct (8) of the engine and is attached to the wing (10). The lower end is positioned inside of the fan duct (8). The lower end further includes an aft section that is attached by lugs (38) to the aft part of the engine core (22), and a forward section that is attached to the forward part of the engine core. Left and right cowl beams (18, 20) extend forward from opposite sides of the forward section of the lower portion of the pylon bifurcation portion (16) and attach to different locations on the forward part of the engine core (22). The cowl beams (18, 20) resist the majority portion of torque forces applied by the engine (12) to the pylon (14).

25 Claims, 3 Drawing Sheets

PYLON AND ENGINE INSTALLATION FOR ULTRA-HIGH BY-PASS TURBO-FAN ENGINES

FIELD OF THE INVENTION

The present invention relates to airplanes, and more particularly to pylons for supporting turbo-fan engines from the wings of jet airplanes.

BACKGROUND OF THE INVENTION

Most modern commercial and military transport airplanes are powered by turbo-fan jet engines suspended from the wings of the airplane by pylons. One end of the pylon is attached to the engine and the other end of the pylon is attached to the wing. The engine end of the pylon passes through the engine nacelle and attaches to several locations on the engine. The principal attachment locations are usually to the engine core or engine fan case.

The pylon is attached to the engine because the engine is heavy, and produces large static and dynamic as well as torque forces. As a result, the attachment locations must be capable of reacting (i.e., resisting) large forces. Because the engine nacelle is made of a lightweight material, incapable of withstanding large forces, the pylon attachment locations must be located within the nacelle's interior on the engine where large forces can be withstood.

While previously developed pylons have been satisfactory, they have several disadvantages that have become increasingly significant as turbo-fan engines have been improved through high by-pass turbo-fan engines to more recently developed ultra-high by-pass turbo-fan engines. The principal disadvantage of pylons is the requirement that a portion of the pylon extend into the core compartment area of the engine and partially block the flow of air through the fan duct of the engine. The portion of the pylon that blocks the flow of air is commonly referred to as the bifurcation, because it divides, or bifurcates, the air-flow through the fan duct. The air blocked by the bifurcation portion decreases the performance of the engine.

Thus, one way to improve the performance of turbo-fan jet engines is to reduce the size of the portion of the pylon that blocks air flow through the engine, i.e., the size of the bifurcation. Because of the static and dynamic forces that the pylon must withstand, in the past it has not been possible to reduce this portion of the pylon below a minimum value.

Another disadvantage of prior art pylons is the time required to perform maintenance tasks on the engine. In the past, many of the cables, hoses, ducts, etc., (hereafter collectively referred to as conduits) must be routed from the engine to other parts of the airplane through small openings in the pylon. This is done to prevent the conduits from creating additional blockage of the airflow through the engine. Many small passages, rather than one large one, are formed to avoid substantially weakening the structure of the pylon. The disadvantage of many small passages is that they are difficult for personnel to readily access when performing engine maintenance or repairs. Thus, maintenance and repair time for the engine is substantially greater than it would be if the conduits that pass through prior art pylons were more accessible.

A related disadvantage of prior art pylons is that they must be made of metal. Metal is required because some of the engine conduits that pass through prior art pylons carry high temperature fluids, such as engine bleed air, while others carry flammable fluids. Further, many prior art pylons include cavities to save weight. If a conduit or hose carrying a flammable fluid bursts, a cavity may fill with the flammable fluid and be ignited if the cavity is close to a conduit carrying a high temperature fluid or gas. Because structures formed of composite materials, which contain resins, are more likely to be damaged by heat than structures formed of metal, in the past pylons have been made of metal. Because pylons are expensive and because pylon heat damage is not uncommon, the ability to repair a pylon has been an important consideration when designing prior art pylons.

SUMMARY OF THE INVENTION

In accordance with the present invention, a pylon for attaching a turbo-fan jet engine, such as an ultra-high by-pass turbo-fan jet engine, to the wing of an airplane is provided. The pylon is attached to the forward and aft parts of the engine core and supports the engine in a way that resists the static and dynamic forces applied to the pylon by the engine. The pylon includes a pylon bifurcation portion, having an upper end and a lower end. The upper end is located outside the fan air duct and is attached to the wing. The lower end is positioned inside the fan air duct. The lower end includes an aft section that is attached to the aft part of the engine core, and a forward section that is attached to the forward part of the engine core. The pylon also includes a left cowl beam, and a right cowl beam. The cowl beams extend forward from opposite sides of the forward section of the lower end of the pylon bifurcation portion and are attached to different locations on the forward part of the engine core. The cowl beams resist the torque, vertical, horizontal and thrust forces applied to the pylon by the engine.

In accordance with further aspects of this invention, the part of the pylon bifurcation portion located inside of the fan duct has a maximum thickness less than nineteen inches, preferably lying in the twelve to sixteen inch range. A pylon of this size obstructs less of the airflow through the fan air duct than a prior art pylon when supporting a comparable ultra-high by-pass turbo-fan jet engine from a comparable wing. Such a pylon obstructs a lower percentage of the airflow through the fan air duct than does a conventional pylon when supporting a standard engine from the wing of a Boeing 747.

In accordance with a further aspect of this invention, an opening is located between the left and right cowl beams. As a result, pylons formed in accordance with the present invention can be formed of composite materials as well as metal. Because pylons formed in accordance with this invention can be formed of composite materials, their weight can be reduced when compared to pylons formed of metal.

Due to their design, engines, such as ultra-high by-pass turbo-fan jet engines, can be attached to pylons formed in accordance with this invention in 75% of the person-hours that it takes to attach the same engine to a conventional pylon. It is expected that an ultra-high by-pass turbo-fan jet engine for a Boeing 777 will be attachable to the pylon of the present invention in no more than 75% of the person-hours it takes to attach a high by-pass turbo-fan jet engine for a Boeing 747 to a conventional pylon.

As will be apparent from the foregoing summary, a pylon formed in accordance with the present invention overcomes the disadvantages of prior art pylons described above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
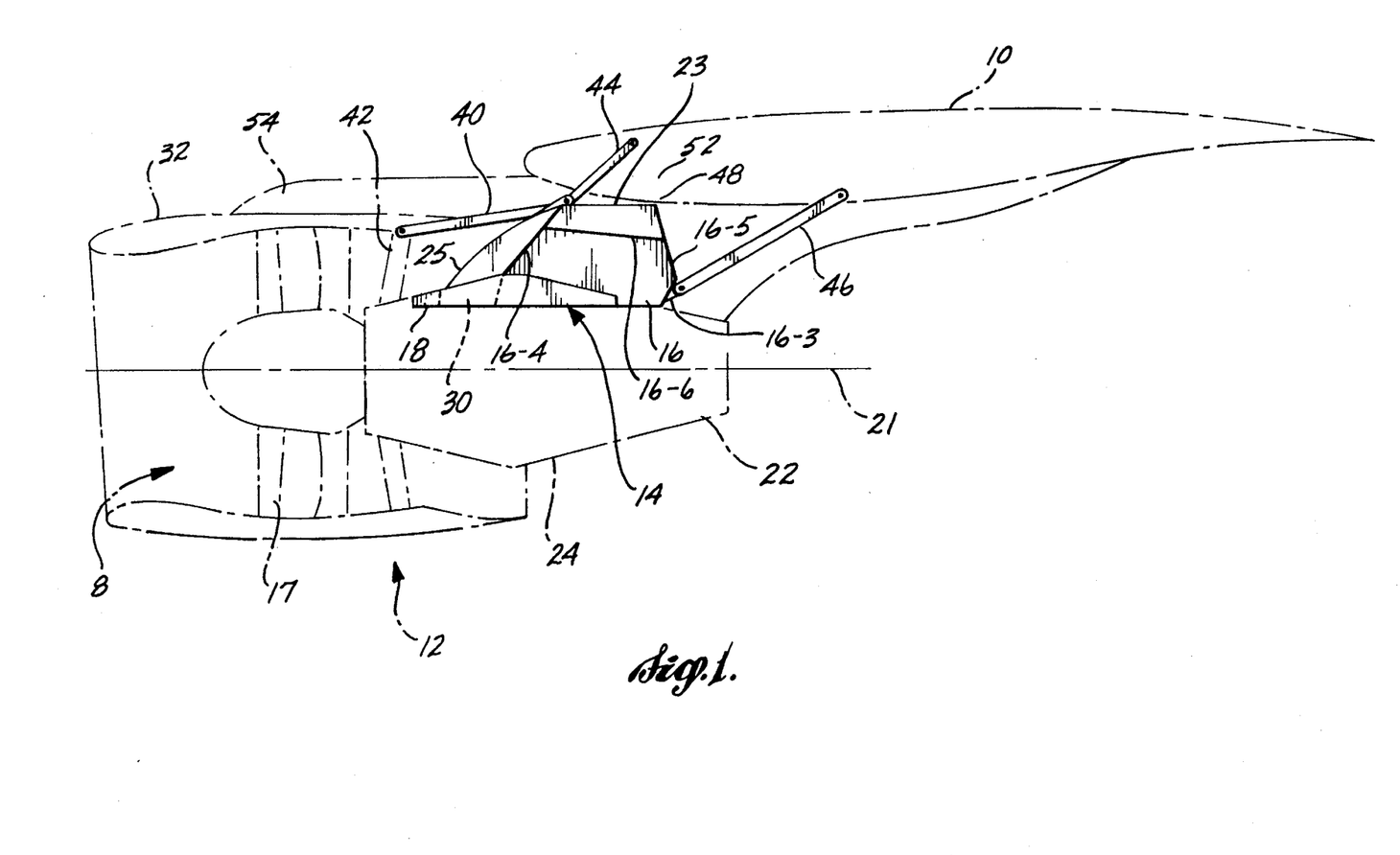
FIG. 1 is a schematic side elevational view of a pylon formed in accordance with the present invention, supporting a turbo-fan jet engine from a wing, the engine and wing being shown in phantom.

FIG. 1 is a schematic side elevational view of a pylon 14 formed in accordance with the present invention. The pylon 14 is shown as supporting an ultra-high by-pass turbo-fan jet engine 12 from the wing 10 of an airplane, such as a Boeing 777. In order to emphasize the invention, the engine and wing are shown in phantom in FIG. 1. As will be understood by those skilled in the art, ultra-high by-pass turbo-fan jet engines have a large diameter. For example, the diameter of the nacelle for an ultra-high by-pass turbo-fan jet engine designed for use on the Boeing 777 is greater than the fuselage of a Boeing 737 airplane. Its diameter is nearly equal to the diameter of the fuselage of a Boeing 757 airplane.

Ultra-high by-pass turbo-fan jet engines are generally defined as engines having by-pass ratios of 15% or more. The by-pass ratio is the ratio of the mass of air passing through the fan duct 8 of the engine 12 to the mass of air passing through the core 22 of the engine. In contrast, high by-pass turbo-fan jet engines are generally defined as engines having by-pass ratios in the range of 5% to 6%.

Figures 2, 3:
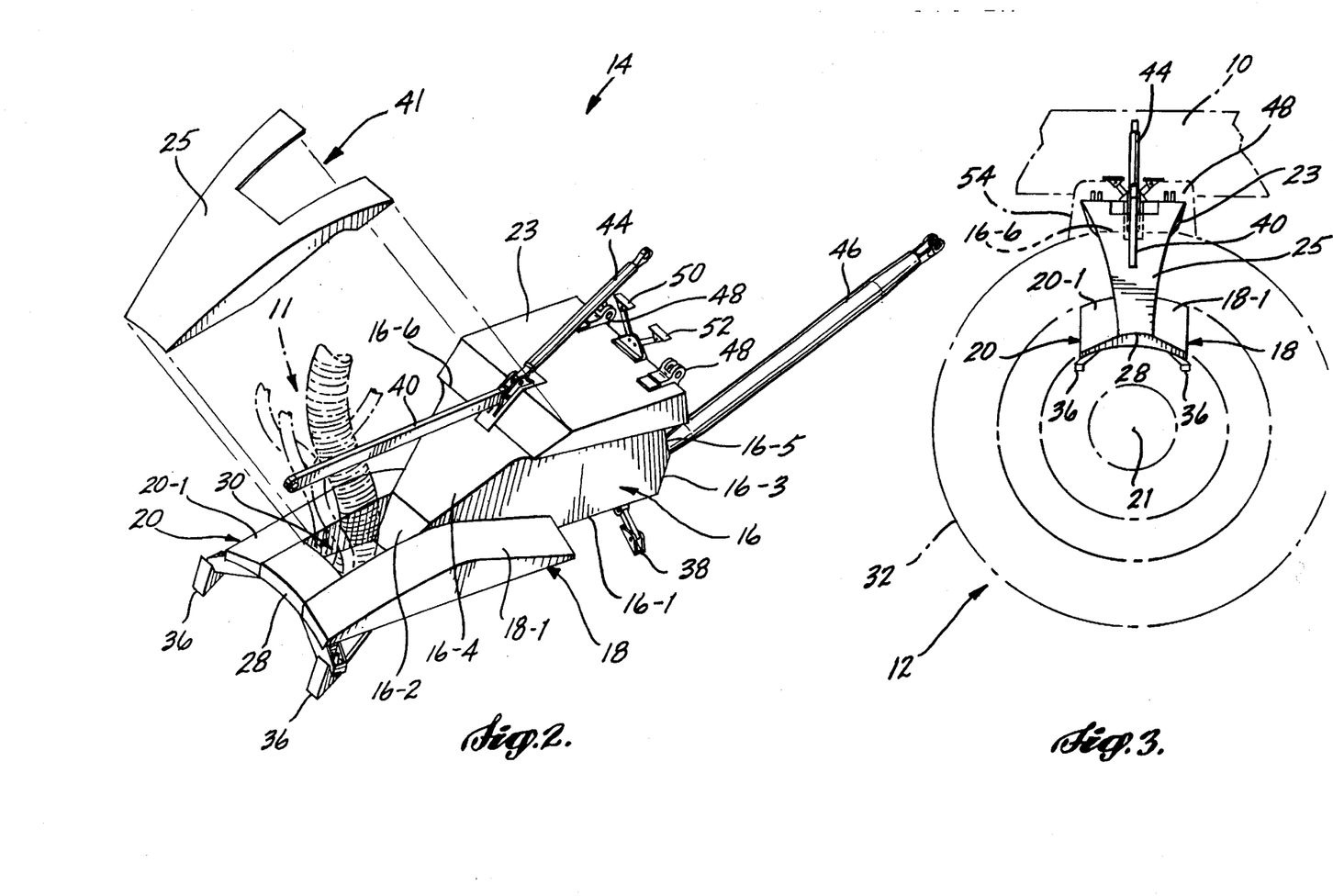
FIG. 2 is a partially exploded isometric view of the pylon FIG. 1.
FIG. 3 is a schematic end-cross sectional view of the turbo-fan jet engine, wing, and pylon of FIG. 1.

FIG. 2 is an isometric view of the pylon 14 shown in FIG. 1. The engine 12 and wing 10 are not shown, except for a portion of some cables, conduits, hoses, ducts, etc. 11 (illustrated in phantom) that extend from the engine to the wing. As best seen in FIG. 2, the pylon 14 includes a bifurcation member 16, generally horizontal, forwardly extending left and right cowl beams 18 and 20, a capping member 23, and a fairing 25. For clarity of illustration, the fairing 25 is shown exploded away from the pylon 14 in FIG. 2. When viewed from the side, the bifurcation member 16 has a six-sided polygonal shape. A longer side forms a generally horizontal base 16-1, and two shorter sides 16-2 and 16-3 slope upwardly from the base 16-1.

One of the shorter sides, called the forward shorter side 16-2 because it is nearest the fan 17 of the engine 12 (seen in FIG. 1), extends vertically upwardly from the base 16-1. The other shorter side, called the aft shorter side 16-3 because it is farthest from the fan 17, extends upwardly and rearwardly (i.e., toward the back of the engine) from the base 16-1. The bifurcation member 16 also includes longer forward and aft sides 16-4 and 16-5, which slope inwardly towards one another from the upper ends of the forward and aft shorter sides 16-2 and 16-3, respectively. The bifurcation member includes a final side, called the upper side 16-6 that slopes forwardly and upwardly at an angle relative to the base 16-1 and connects the upper ends of the longer forward and aft sides 16-4 and 16-5.

FIG. 3 is an end elevational view (looking rearwardly) of the pylon 14 shown in FIGS. 1 and 2 with the wing 10 and engine 12 again shown in phantom. FIG. 3 best illustrates that the thickness of the bifurcation member 16 increases as one proceeds from the lower surface 16-1 to the upper surface 16-6. (The upper surface 16-6 is shown as a hidden line in FIG. 3 because it is behind the fairing 25.) FIG. 2 also illustrates that the thickness of the bifurcation member 16 increases as one proceeds from the lower surface 16-1 to the upper surface 16-6.

Returning to FIG. 2, the cowl beams 18 and 20 lie substantially parallel to each other and are located on opposite sides of the lower part of the bifurcation member 16. The cowl beams 18 and 20 may be formed integral with the bifurcation member 16, or one or both may be separately attached. The lower surface of the cowl beams, like the lower surface of the base 16-1 of the bifurcation member 16, are configured to correspond to the internal shape of the engine core 22. As shown in FIG. 3, in the lateral direction the shape may be a convex curve having its center located at the longitudinal axis 21 of the engine core 22. In the longitudinal direction, the upper surfaces 18-1, 20-1 of the cowl beams 18 and 20 slope upwardly from each end, cresting in rounded peaks at the center of each beam. The cowl beams 18 and 20 extend forwardly of the bifurcated member 16 and are positioned such that the forward shorter side 16-2 lies generally between the rounded peaks located at the center of the cowl beams.

As illustrated best in FIG. 3, in the lateral direction the upper surfaces 18-1 and 20-1 of the cowl beams 18 and 20 are curved convexly so as to form a segment of a circle having a center located at the longitudinal axis 21 of the engine 12. Moreover, the curvature is such that it is substantially identical to the curvature of the outer surface of the engine core 22. Thus, when the pylon 14 is attached to the engine 12, the cowl beams 18 and 20 aerodynamically match the cowling 24 that surrounds the remainder of the engine core 22. As illustrated in FIG. 1, the diameter of engine core cowling 24 increases and then decreases when moving from front to back. Therefore, the diameter of the circular cross sections of the upper surfaces 18-1 and 20-1 of cowl beams 18 and 20 increase and then decrease in a corresponding manner, as clearly seen in FIGS. 1 and 2. As will be appreciated by those familiar with turbo-fan jet engines, this shape is common to most cowlings surrounding the core of such engines.

As best seen in FIG. 2, bridge 28 is located between the forward ends of the cowl beams 18 and 20. The upper surface of the bridge 28 is arched to match the curvature of the engine cowling 24 and the cowl beams 18 and 20. The bridge 28 may be formed integrally with the cowl beams 18 and 20, or formed separately and inserted therebetween. Alternatively, the bridge 28 may form part of the engine cowling 24, rather than being a part of the pylon 14.

An important feature of bridge 28 is that when located between the forward ends of the cowl beams 18 and 20, the aft side of the bridge is spaced away from bifurcation member 16, thereby defining a throughway 30 between the cowl beams 18 and 20 and between the aft side of the bridge and the forward short side 16-2 of the bifurcation member 16. Throughway 30 is for the passage of cables, hoses, ducts, etc. (collectively conduits) 11 (a portion of which are shown in phantom in FIG. 2) that run between the engine core 22 and the wing 10.

The upper side 16-6 of the bifurcation member 16 adjoins the lower surface of the capping member 23. The capping member 23 may be formed integrally with the bifurcation member 16, or separately formed and attached thereto. The capping member 23 has forward and aft edges that are sloped to match the slope of the longer forward and aft sides 16-4 and 16-5 of the bifurcation member 16. Thus, a smooth transition occurs between the longer forward and act sides 16-4 and 16-5 of the bifurcation member 16, and the forward and act edges of the capping member 23.

Various mechanisms may be used to attach the pylon 14 to a turbo-fan jet engine 12. In the embodiment of the intention illustrated in FIGS. 1–3, lugs 36, affixed to the lower, forward surfaces of the cowl beams 18 and 20 are used to attach the pylon 14 to the forward portion of the engine core 22. Aft lugs 38 (only one is visible in FIG. 2) affixed to the lower surface 16-1 of the bifurcation member 16 are used to attach the pylon 14 to the aft: portion of the engine core. A strut 40 that projects forwardly from the forward edge, of the capping member 23 is used to attach the pylon to the fan casing 42, as shown in FIG. 1.

Other mechanisms attach the pylon 14 to the wing 10. The outer ends of struts 44 and 46 that project rearwardly from the forward edge of capping member 23 and the aft shorter side 16-3 of bifurcation member 16, respectively, are attached to the wing. Two clevises 48, one projecting from each side of the aft upper surface of capping member 23, are also attached to the wing. Positioned between the devises 48 are shorter struts 50 and 52 whose outer ends are attached to the wing 10.

When a pylon 14 formed in accordance with this invention is used to attach an engine 12 to a wing 10, the bifurcation member 16 extends through the upper surface of the engine nacelle 32. The size of the pylon is such that the capping member 23 lies above and behind the engine nacelle 32, as illustrated in FIGS. 1 and 3. Thus, capping member 23 does not impede the flow of air through the fan duct 8. As the majority portion of the bifurcation member 16 does impede the flow of air through the fan duct 8, the sides of bifurcation member 16 that face the direction of air flow, in particular, the forward sides 16-2 and 16-4, are covered by an aerodynamically contoured fairing 25.

The fairing 25 also covers the conduits 11 that pass through throughway 30. The forward portion of fairing 25 crosses the upper side of bridge 28 that borders throughway 30, and lies along the inner upper edges of the cowl beams 18 and 20 that also border the throughway. From these locations, the fairing 25 extends to the upper forward edge of capping member 23. The conduits 11 are routed from throughway 30 along forward shorter and longer sides 16-2 and 16-4 of the bifurcation member 16, and along the forward surface of the capping member 23, around either side of the strut 40, to the wing 10. A cut-out 41 is provided in the upper portion of fairing 25 so that the conduits 11 can pass from the fairing, along either side of strut 40, to the wing 10. The cut-out 41 provided in fairing 25 is located above the engine nacelle 32. Thus, as shown in FIG. 1, the cut-out 41 does not affect the smooth aerodynamic surface of the fairing 25 that is presented to the flow of air through the engine 12.

Preferably, fairing 25 is made of a conventional aircraft structural material, having a light weight so as to not add unnecessary weight to an airplane. Fairing 25 is fastened to bridge 28, cowl beams 18 and 20, bifurcation member 16, and/or capping member 23 by any suitable method known in the art sufficient to secure the fairing in place without significantly decreasing the aerodynamic efficiency of the flow of air through the fan duct 8.

All of the mechanisms for attaching the pylon to the wing 10, except for the strut 46 that projects rearwardly from the aft shorter side 16-3 of the bifurcation member 16 are above the engine nacelle 32. Because the strut 46 that projects rearwardly from the aft shorter side 16-3 is positioned behind the bifurcation member 16, its cross-sectional area relative to the flow of air through the fan duct 8 is obscured by the bifurcation member 16.

All of the mechanisms for attaching the pylon to the engine 12, except for the strut 40 that projects forwardly from the forward edge of the capping member 23, are located below the pylon 14. Because the outer edge of the strut 40 that projects forwardly from the forward edge of the capping member 23 is attached to the upper portion of the fan casing 42, it lies substantially above the flow of air through the fan duct 8. A fairing 54, shown in FIG. 1, that extends between the engine 12 and the wing 10, covers the portions of the pylon 14, and the portions of the mechanisms that lie above the engine nacelle 32.

Figure 4:
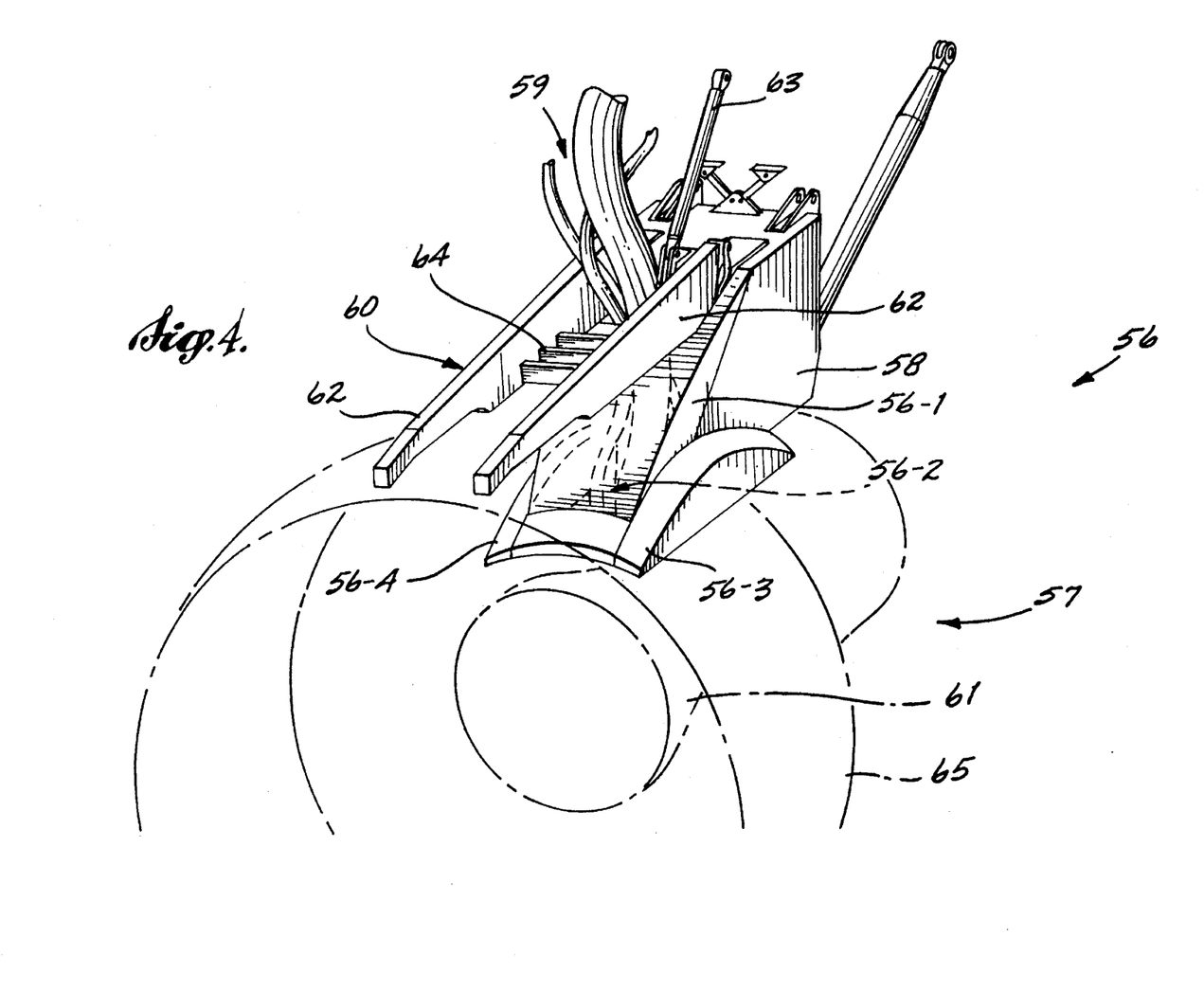
FIG. 4 is an isometric view of an alternative embodiment of a pylon formed in accordance with the present invention.

An alternative embodiment of a pylon 56 formed in accordance with the present invention is shown in FIG. 4. More specifically, FIG. 4 is a perspective view of a pylon 56 formed in accordance with this invention attached to an engine 57, shown in phantom, from which the engine nacelle has been removed for clarity. Alternative pylon 56 is shown with a fairing 56-1 in place, covering the cables, conduits, hoses, ducts, etc. 59 that pass from the engine core 61 through a throughway 56-2 between left and right cowl beams 56-3 and 56-4. The portion of the cable, conduits, hoses, ducts, etc. 59 covered by fairing 56-1 are shown in phantom.

There are two principal differences between the alternative pylon 56 shown in FIG. 4 and the pylon 14 shown in FIGS. 1–3. First, the alternative pylon 56 is devoid of a capping member. Instead, the bifurcation member 58 of the alternative pylon 56 has a greater thickness that gradually increases from the bottom to the top. This eliminates the need for a capping member.

Second, the alternative pylon 56 includes a forwardly projecting strut 60 that is different from the forwardly projecting strut 40 of the pylon 14. The forwardly projecting strut 60 of the embodiment of the invention shown in FIG. 4 includes two parallel beams 62 that extend forwardly in cantilevered, spaced-apart relationship from the upper, forward edge of the longer forward side of the bifurcation member 58. The beams 62 are symmetrically located on opposite sides of a central strut 63 that projects rearwardly from the upper forward edge of the longer forward side of the bifurcation member 58. The distal end of each beam is connected to the fan casing 65. A plurality of substantially parallel braces 64 mounted transversely between the beams 62 connect the beams together. The cables, conduits, hoses, ducts, etc. 59 from the engine core 61 pass between the parallel beams, and then to the wing.

Many turbo-fan jet engines are sensitive to bending moments due to the close tolerance between the engine turbine blades and the engine casing. In such engines, engine nacelle bending can result in the turbine blades impacting the engine casing. Aerodynamic forces that act on an engine nacelle tend to bend the engine core section either up or down. The forward struts 40 or 60 of both embodiments of the invention resist nacelle bending moments and prevent the transfer of nacelle bending moments to the engine. Obviously, struts 40 or 60 may not be required in engines that are sufficiently stiff.

A major advantage of pylons formed in accordance with the invention is that they obstruct a lesser percentage of airflow through a fan duct of an engine, than do prior art pylons supporting a comparable engine. In prior art pylons, the bifurcation member is thicker and thus blocks more air flow. There are three primary reasons why the bifurcation member 16 or 58 of the previously described embodiments of the invention is thinner and, thus, blocks less of the airflow in a fan duct, than do prior art pylons.

First, because pylons 14 or 56 do not have holes formed through the bifurcation member 16 or 58 for the passage of cables, hoses, ducts, etc., (e.g., conduits) they have a greater capacity on a per unit basis to resist static and dynamic forces than do prior art pylons. That is, in order to have the same capacity to resist static and dynamic forces, the bifurcation members of prior art pylons must be made bigger to account for the weakening caused by the holes for conduits. Further, prior art pylons must be larger so that maintenance personnel have enough space to connect the conduits that pass through the pylons. Rather than conduits passing through the pylon, these items pass through the throughways 30 or 56-2 located in front of each the bifurcation members 16 or 58 of the previously described embodiments.

The spaced-apart left and right cowl beams, as explained more fully later, also provide a closer mechanical coupling with the engine than prior art pylons. The closer mechanical coupling generally improves the ability of pylons 14 and 56 to resist static and dynamic forces.

Second, because a substantial majority of the torque around the longitudinal axis of the engine 12 or 57 must be resisted where a pylon is attached to the rear of the engine core 22 or 61, the bifurcation member of prior art pylons has a thicker aft portion. (The greatest amount of torque to be resisted about the longitudinal axis of the engine occurs when an engine seizure occurs.) The spaced apart left and right cowl beams of pylons 14 and 56 formed in accordance with this invention provide a large moment arm that resists engine torque. Because the cowl beams resist a substantial majority of the engine torque, the aft portion of the bifurcation member 16 or 58 may be thinner. Ultimately, the torque is transmitted to the bifurcation member 16 or 58, but the bifurcation member itself may be made thinner because it does not have to directly provide the moment arm necessary to resist engine torque.

The third reason why the bifurcation member 16 or 58 can be made thinner also relates to the addition of the left and right cowl beams. The left and right cowl beams cause the pylons formed in accordance with the invention to take on an I-beam shape, as illustrated in FIG. 3. That is, the pylons 14 or 56 have a narrow body section relative to its upper and lower portions. As well known in the art, based on strength-to-weight ratios, an I-beam is the ideal shape for resisting forces applied generally parallel to the vertical body of the I-beam. The amount of such force that can be resisted is proportional to the cube of the height of the I-shape. The addition of the left and right cowl beams increases the effective height of the I-shape of a pylon formed in accordance with this invention, making the pylon more effective at resisting forces caused by the vertical bending of an engine nacelle.

All of the foregoing reasons allow the width of a bifurcation member 16 or 58 of a pylon formed in accordance with this invention to be decreased when compared to the bifurcation member of prior art pylons. For example, the bifurcation member of prior art pylons used to support a standard Boeing 747 airplane engine have a maximum width of around nineteen inches. A bifurcation member of a pylon 14 or 56 will have a maximum thickness of sixteen inches when supporting the much larger ultra-high by-pass turbo-fan jet engine on a Boeing 777. In this regard, Boeing 777 ultra-high by-pass turbo-fan jet engines generate a maximum sustained operating thrust of around 85,000 pounds, whereas standard Boeing 747 engines generate around 55,000 pounds. It is estimated that the maximum thickness of the bifurcation members of a pylon of the type shown in FIGS. 1–3 could be reduced as low as twelve inches for the Boeing 777 ultra-high by-pass turbo-fan jet engine.

Pylons formed in accordance with the invention have the advantage of allowing an engine to be suspended from the wing of an airplane without the use of conventional vibration isolators. More specifically, prior art pylons require that vibration isolators be used in order to avoid unacceptable levels of sound waves being transmitted from the engine to the wing and, thus, to the fuselage of the aircraft. This can be avoided by pylons formed in accordance with the present invention because the stiffness of the cowl beams may be adjusted to damp out vibrations from the engine. Standard methods known in the art may be used to adjust the stiffness of the cowl beams, such as changing the skin gauge or adding more ribs and stringers, using alloys of different strengths, heat treating alloys to affect their strength, etc.

Another advantage of pylons formed in accordance with this invention is the close mechanical coupling between the engine and the pylon. With prior art pylons, a substantial majority of the coupling is between the aft portion of the bifurcation member and the aft portion of the engine core. In comparison, the spaced-apart cowl beams of pylons 14 or 56 provide greater surface contact with an engine core 22 or 61, resulting in closer mechanical coupling and a greater ability to resist static and dynamic forces from the engine. Hence, relative deflections between the engine 12 or 57 and the pylon 14 or 56, are smaller. The relative deflections of an ultra-high by-pass turbo-fan jet engine of a Boeing 777 incorporating a pylon 14 or 56 formed in accordance with this invention are expected to be less than the relative deflections of a standard high by-pass turbo-fan jet engine (e.g., a General Electric Model 90 engine) mounted to a Boeing 777 with a prior art pylon.

Presently, pylons formed in accordance with this invention are preferably made of conventional airplane metal alloys by conventional methods that are well known in the art. In this regard, such pylons may be formed of a skeleton of internal supporting ribs and an external skin and, thus, like prior art pylons, have internal cavities. While metal is presently preferred as explained next, an advantage of pylons formed in accordance with the invention is that they may also be made of composite materials.

As noted above, in prior art pylons the cables, hoses, conduits, ducts, etc. (e.g., conduits) that connect the core of a turbo-fan jet engine to other parts of the airplane are routed through many openings formed in the pylon. This is done to prevent conduits from blocking air through the fan duct of the engine. Some of these items carry high temperature fluids, such as engine bleed air, while others carry flammable fluids. If an item such as a fuel line bursts within the prior art pylon, cavities within the pylon fill with fuel. Eventually, the fuel will come into contact with another conduit, such as a duct, carrying a high temperature fluid. This can ignite the fuel, causing damage to the pylon.

Metal alloy pylons can be repaired and used again, because metal is malleable and repairable. In the past, although they have a high strength-to-weight ratio, composite materials have not been used to create pylons because the resins in composite materials are more sensitive to heat than are contemporary metal alloys. Thus, pylons formed of composite materials are more subject to destruction beyond repair than are metal pylons. Because pylons are expensive, repair considerations are important.

In contrast, because the conduits running between the engine core 22 or 61 and the airplane do not pass through a pylon 14 or 56 formed in accordance with this invention, the same disadvantage of using composite materials does not exist. Because the conduits that run between the engine and the airplane lie outside of the pylon 14 or 56, if a flammable fluid line bursts, the released fluid runs off the exterior of the pylon. If the fluid ignites, heat is not concentrated in the pylon and any resulting fire will not do as much damage to the pylon as if the fire occurred in a cavity of a pylon. As a result, pylons formed in accordance with the invention are more susceptible to being formed of composite materials than are prior art pylons.

Another advantage of the throughway 30 or 56-2 formed between the cowl beams of pylons 14 or 56 formed in accordance with the invention is that the throughways significantly reduce the time required for engine maintenance and/or repair when compared to prior art pylons. More specifically, the many small openings in prior art pylons makes it difficult for maintenance personnel to access the cables, ducts, hoses, etc. running through the pylon. In contrast, the larger throughway 30 or 56-2 of the pylon 14 or 56 makes it much easier to perform maintenance and/or repairs. Further, the number of person-hours required to attach or remove an engine from such a pylon is reduced. It is estimated that removal of an engine from a pylon of the previously described embodiments of the invention requires no more than 75% of the time required to attach or remove a comparable engine from a prior art pylon.

While preferred embodiments of the invention have been illustrated and described, it will be appreciated that various changes can be made therein. Hence, within the scope of the appended claims, it is to be understood that the invention can be practiced otherwise than as described herein.

The embodiments of the invention in which an exclusive property or privilege is claimed are defined as follows:

1. A pylon for supporting a turbo-fan jet engine from an airplane wing and resisting static and dynamic forces generated by the engine and a nacelle of the engine, said pylon comprising:
   (a) a bifurcation portion, including an upper end for attachment to the wing of an airplane, a lower end for attachment to the core of a turbo-fan jet engine, and opposing sides;
   (b) a left cowl beam and a right cowl beam, each extending outwardly from the opposing sides of the bifurcation portion near the lower end thereof, said cowl beams each including a first end connected to the bifurcation portion, and a second end opposite the first end, the second end of each cowl beam extending to a location forward of the bifurcation portion;
   (c) wing attachment means for attaching the upper end of said bifurcation portion to the wing of an airplane; and
   (d) engine attachment means for attaching the lower end of said bifurcation portion and said cowl beams to the core of a turbo-fan jet engine.

2. The pylon of claim 1, wherein said pylon bifurcation portion has a maximum thickness of less than nineteen inches.

3. The pylon of claim 2, wherein said pylon bifurcation portion has a maximum thickness lying in the range of from twelve inches to sixteen inches.

4. The pylon of claim 1, wherein the pylon bifurcation portion has a maximum thickness no greater than twelve inches.

5. The pylon of claim 1, wherein the turbo-fan jet engine includes a plurality of electrical and fluid conduits passing from the engine core to the airplane wing and wherein an opening of sufficient size is defined between the right and left cowl beams of the pylon, to pass all of the conduits therethrough.

6. The pylon of claim 5, wherein the opening through which the conduits pass does not extend through the bifurcation portion of the pylon.

7. The pylon of claim 6, wherein each of the cowl beams lie in spaced-apart, generally parallel relationship to one another, said spaced-apart, generally parallel relationship defining said opening between the cowl beams.

8. The pylon of claim 7, wherein the cowl beams are attached to each other by a bridge portion for a portion of their lengths, the opening being bordered by the bridge portion, each of the cowl beams, and the bifurcation portion of the pylon.

9. The pylon of claim 1, wherein the pylon is formed of a composite material.

10. The pylon of claim 1, wherein the wing attachment means includes a plurality of struts, each strut having a first end attached to the pylon and a second end suitable for attachment to the wing of an airplane.

11. The pylon of claim 10, wherein at least one strut attaches to the bifurcation portion of the pylon.

12. A pylon for supporting a turbo-fan jet engine from an airplane wing and resisting static and dynamic forces generated by the engine and a nacelle of the engine, said pylon comprising:
   (a) a bifurcation portion, including an upper end for attachment to the wing of an airplane, a lower end for attachment to the core of a turbo-fan jet engine, and opposing sides;
   (b) a left cowl beam and a right cowl beam, each extending outwardly from the opposing sides of the bifurcation portion near the lower end thereof;
   (c) wing attachment means for attaching the upper end of said bifurcation portion to the wing of an airplane;
   (d) engine attachment means for attaching the lower end of said bifurcation portion and said cowl beams to the core of a turbo-fan jet engine; and
   a cap located at the upper end of the bifurcation portion, the cap having a thickness greater than the maximum thickness of the bifurcation portion, and being positioned above the nacelle of the turbo-fan jet engine and wherein the wing attachment means includes at least one strut having a first end attached to the cap and a second end suitable for attachment to the wing of an airplane.

13. The pylon of claim 12, wherein the wing attachment means includes at least one clevis affixed to the cap for attachment to the wing of an airplane.

14. The pylon of claim 12, wherein the engine attachment means includes at least one strut, having a first end attached to the cap and a second end suitable for attachment to the fan casing of a turbo-fan jet engine.

15. The pylon of claim 14, wherein the engine attachment means includes at least two struts, each strut having a first end attached to the cap, and each strut having a second end suitable for attachment to the fan casing of a fan jet engine, the struts being arranged in a spaced-apart, generally parallel relationship to one another.

16. The pylon of claim 1, wherein the engine attachment means includes at least one lug affixed to the lower end of the bifurcation portion that is suitable for attachment to a core of the turbo-fan jet engine.

17. The pylon of claim 1, wherein each of the cowl beams have a lower surface, and the engine attachment means includes at least one lug affixed to the lower surface of at least one of the cowl beams that is suitably for attachment to the core of the turbo-fan jet engine.

18. An engine support assembly for supporting a turbo-fan jet engine from an airplane wing and resisting static and dynamic forces generated by the engine and a nacelle of the engine, said engine support assembly comprising:
   (a) a turbo-fan jet engine having a core;
   (b) an airplane wing; and
   (c) a pylon, including:
      (i) a bifurcation portion having an upper end attached to the airplane wing, a lower end attached to the core of the turbo-fan jet engine, and opposing sides; and
      (ii) a left cowl beam, and a right cowl beam, each extending outwardly from the opposing sides of the bifurcation portion near the lower end thereof, the cowl beams each including a first end connected to the bifurcation portion, and a second end opposite the first end, the second end of each cowl beam extending to a location forward of the bifurcation portion, wherein each said cowl beam is attached to the core of the turbo-fan jet engine.

19. The engine support assembly of claim 18, wherein said bifurcation portion has a maximum thickness of less than nineteen inches.

20. The engine support assembly of claim 19, wherein said bifurcation portion has a maximum thickness lying in the range of from twelve inches to sixteen inches.

21. The engine support assembly of claim 18, further comprising a plurality of electrical and fluid conduits passing from the engine core to the airplane wing and wherein an opening of sufficient size is defined between the right and left cowl beams of the pylon, to pass all the conduits therethrough.

22. The engine support assembly of claim 21, wherein the opening through which the conduits pass does not extend through the bifurcation portion of the pylon.

23. The engine support assembly of claim 22, wherein each of the cowl beams extend in a spaced-apart, generally parallel relationship to one another, said spaced-apart, generally parallel relationship defining said opening between the cowl beams.

24. The engine support assembly of claim 23, wherein the cowl beams are attached to each other by a bridge portion for a portion of their lengths, the opening being bordered by the bridge portion, each of the cowl beams, and the bifurcation portion of the pylon.

25. The engine support assembly of claim 18, wherein the pylon further is formed of a composite material.

* * * * *

UNITED STATES PATENT AND TRADEMARK OFFICE
CERTIFICATE OF CORRECTION

PATENT NO. : 5,467,941
DATED : November 21, 1995
INVENTOR(S) : W.T. Chee

It is certified that error appears in the above-indentified patent and that said Letters Patent is hereby corrected as shown below:

| COLUMN | LINE | |
|---|---|---|
| 5 | 4 | "act" should read --aft-- |
| 5 | 6 | "act" should read --aft-- |
| 5 | 14 | "aft:" should read --aft-- |
| 7 | 21 | "fight" should read --right-- |
| 7 | 33 | "fight" should read --right-- |
| 9 (Claim 1, | 48 line 9) | "fight" should read --right-- |

Signed and Sealed this

Eleventh Day of June, 1996

Attest:

BRUCE LEHMAN

Attesting Officer

Commissioner of Patents and Trademarks